March 11, 1952
C. HERZSTARK
2,588,835
INDEPENDENT ACTUATOR TENS-TRANSFER MECHANISM
Filed Oct. 27, 1949
4 Sheets-Sheet 1
Fig. 1
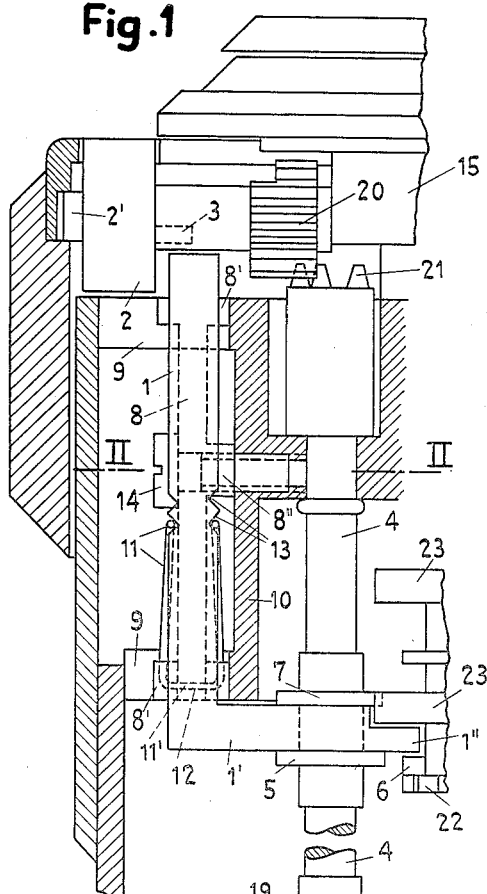
Fig. 3
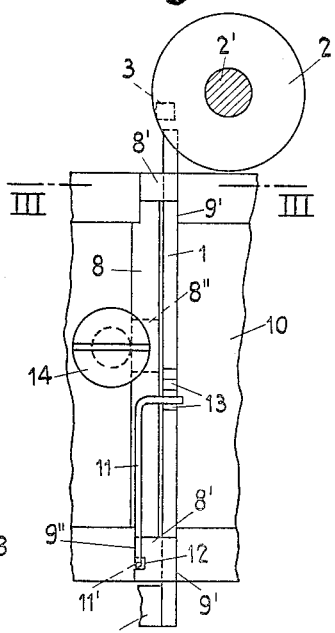
Fig. 2
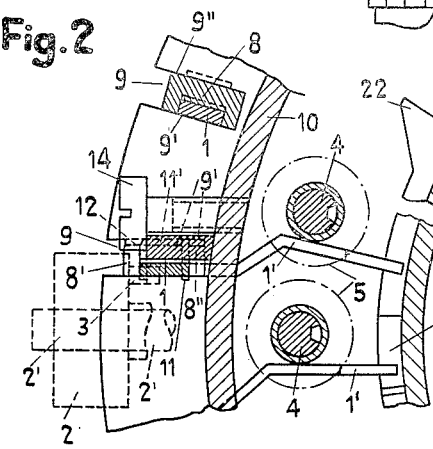
Fig. 4
Fig. 5
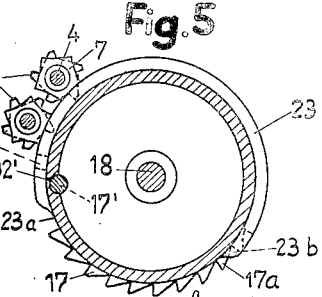
Inventor:
Curt Herzstark
by Singer, Stern & Carlberg, Attys.

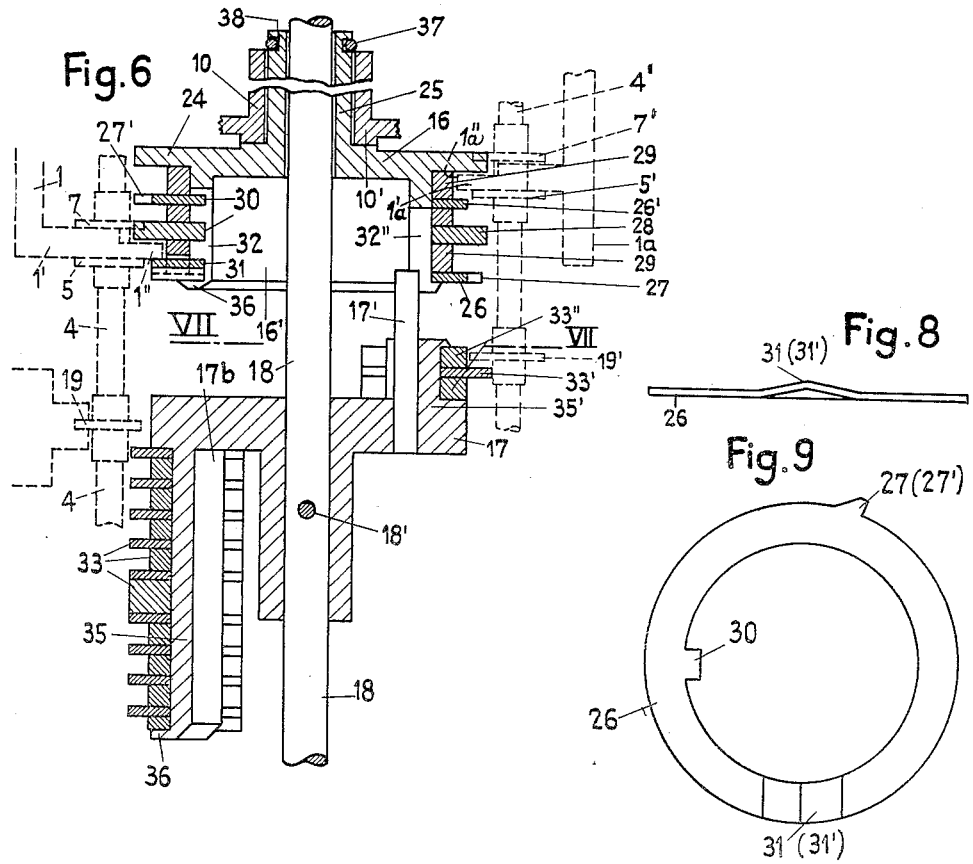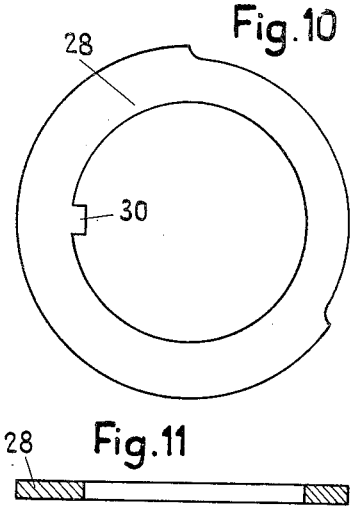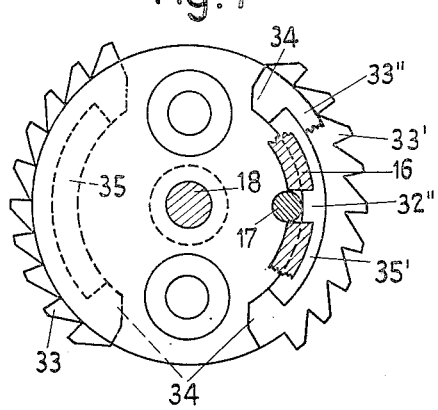

March 11, 1952 C. HERZSTARK 2,588,835
INDEPENDENT ACTUATOR TENS-TRANSFER MECHANISM
Filed Oct. 27, 1949 4 Sheets-Sheet 3

Inventor:
Curt Herzstark,
by Singer, Stern & Carlberg
Attorneys.

March 11, 1952

C. HERZSTARK 2,588,835

INDEPENDENT ACTUATOR TENS-TRANSFER MECHANISM

Filed Oct. 27, 1949

INVENTOR
CURT HERZSTARK
BY Singer, Stern & Carlberg
ATTORNEYS

Patented Mar. 11, 1952

2,588,835

UNITED STATES PATENT OFFICE 2,588,835

INDEPENDENT ACTUATOR TENS-TRANSFER MECHANISM

Curt Herzstark, Mauren, Liechtenstein, assignor to "Contina" Buro- und Rechenmaschinenfabrik A. G., Mauren, Principality of Liechtenstein Application October 27, 1949, Serial No. 123,850
In Austria November 3, 1948

3 Claims. (Cl. 235—137)

The object of the present invention is a tens-transmission device in a pocket-size calculating machine for all four arithmetical operations and the actuating members therefor, and it refers especially to a machine with a machine body and a central driving member (stepped cylinder) around which the transmission and counter mechanism members are arranged.

To make the manufacture of such pocket-size calculating machines as economical and cheap as possible, it is of paramount importance in view of the naturally restricted bulk of the machine to design the calculating mechanism on the simplest possible lines and so to arrange it that it can be fitted into the machine without difficulty and can be removed from same with equal ease. For this purpose the body of the machine in accordance with the present invention is so made and the members of the tens-transmission device are so designed that the latter can be inserted in the body of the machine, from the side, without obstruction from other parts of the calculating mechanism, the fitting of said device requiring practically no special fixing means.

Furthermore, an essential member of the tens-transmission device consists in accordance with the invention in a flat, angular slidebar which, at each digit position, directly creates the operation connection between the ten-transmission finger and the axially slidable tens-transmission (tens-carrying) wheels, on the one hand, and on the other hand connects the latter with the returning device.

Furthermore said angular slidebars are, according to the invention, loosely placed in guide rails of channel-shaped section and inserted with these latter into lateral recesses in the body of the machine, the slidebars being precisely guided in their sliding movement by the guide rails and one wall of the recesses, at two end positions relatively distant from each other, said guided sliding motion ensuring faultless functioning of the tens-transmission device. Furthermore, these components of the tens-transmission device are merely inserted the one within the other, so that with the exception of a single fixing screw for the guide rail, no further additional fixing means are used. A further essential feature of the invention is that the tens-transmission teeth, and also the return-motion members for the tens-transmission members, and the locking members of the product counter and the revolution counter acting on the ratchet wheels of the tens-transmission wheels, are provided on one common rotating member. On this functional component, hereinafter referred to as the tens-transmission dome, and also on the stepped cylinder, the actual transmission and driving elements are naturally of restricted dimensions and are furthermore subjected to a not inconsiderable strain during calculating operations. To render these transmission and driving elements as robust as possible, and at the same time to render the entire tens-transmission dome and the stepped cylinder easy and economical to manufacture, they each consist, according to the invention, of a core-piece on which the transmission and driving elements are mounted in the form of rings or segments of rings. The transmission and driving elements are manufactured of a highly resistant material, whereas in the core-piece more importance is attached to lightness in weight.

Fig. 1 in the drawing shows a fragment of the machine with one digit position of the tens-transmission device in accordance with the invention, in enlarged vertical section;

Fig. 2 shows a section along the line II—II in Fig. 1, the section through the upper slidebar being laid along the line III—III of Fig. 3;

Fig. 3 a partial front elevation to Fig. 1;

Fig. 4 the tens-transmission dome with a portion of the stepped cylinder, in elevation;

Fig. 5 a section through the tens-transmission dome with the toothed parts of the stepped cylinder cooperating with the product counter mechanism and with the tens-transmission and ratchet wheels of two digits;

Fig. 6 a further embodiment of the ten-transmission dome and stepped cylinder in vertical section;

Fig. 7 a section along the line VII—VII in Fig. 6;

Figs. 8-11 functional elements of the tens-transmission dome;

Fig. 12 is a section similar to that shown in Fig. 1,

Fig. 13 is a partial front elevation to Fig. 12 and

Fig. 14 is a diagrammatic view of the slidebar.

Figure 12:
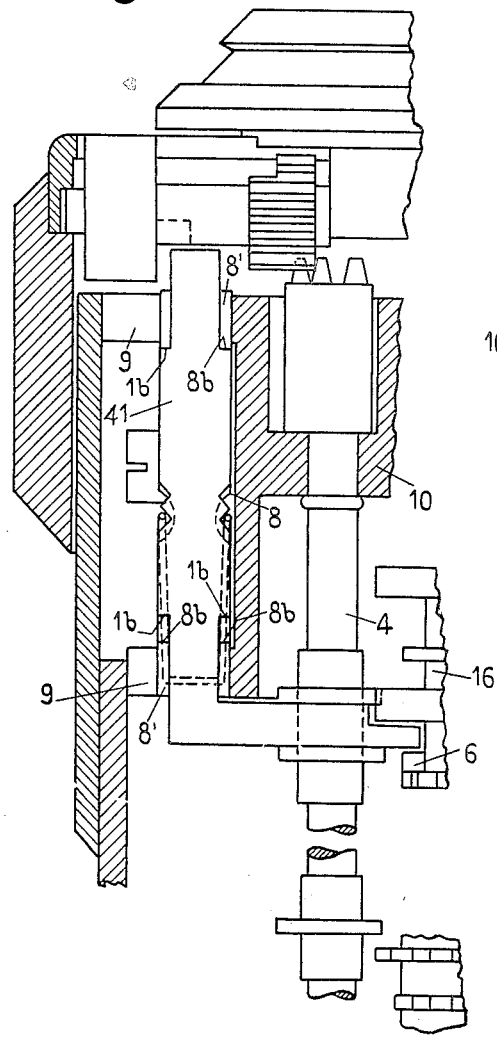
Figs. 12-14 show a second embodiment of these figures.

The essential component of the tens-trnasmission mechanism for the product counter mechanism and the revolution counter mechanism is, for each digit-position, a flat, angular slidebar 1, 1' and 1a respectively (Figs. 1 and 6) which directly establishes an operative connection between the tens-transmission fingers 3 arranged on the numeral wheel 2 and the tens-transmission (tens-carrying) wheels 5 and 5' respectively, of the next higher digit position and axially slidably mounted on the shaft 4 and 4' respectively, said wheels 5 and 5' furthermore being connected with the return-motion device 6 and 6' (31 and 31') respectively. To connect the angular slidebar 1 (1a) to the tens-transmission (tens-carrying) wheel 5 (5') of the next higher digit-position, said slidebar engages with its bent, lower arm 1' (Fig. 2) edgewise and from the side the neck formed between the tens-transmission wheel 5 (5') and the ratchet wheel 7 (7') integrally formed with said tens-transmission wheel. The angular slidebar 1 (1a) is expediently manufactured of light-gauge sheet steel, rectangular in cross-section and loosely placed in a guide-rail 8 (Fig. 2). To reduce surface friction to a minimum it is guided only at the two ends 8' of the guide-rail 8, which latter exhibits a channel-shaped cross-section at these points and is fitted as a snug fit into two lateral recesses 9, placed one above the other, in the rigid machine body 10. The walls 9' of the recesses 9 in the machine body constitute the fourth limit of the channel-shaped cross-section of the guide-rail. In these short guide-channels, placed relatively widely apart, the angular slidebar 1 is accurately guided. The angular slidebar 1 is retained in the normal and the transmitting position by a thin wire spring 11 bent into the shape of a letter U. The spring 11 is inserted with its bridge-member 11' in a transverse groove 12 of the guide-rail 8 so as to constitute a snug fit, and is furthermore retained by the contiguous limiting wall 9" of the recess 9 (Figs. 2 and 3). The wire spring 11 engages with its bent ends in recesses 13 of the angular slidebar 1.

The guide-rail 8 inserted in the recesses 9 is pressed, by the head of a bolt 14 screwed into the body of the machine, against the body 10 of the machine, bearing at the same time with a lateral projection 8" against the wall of the machine body 10. The tens-carrying finger 3 of the numeral wheel 2 acts on that end of the angular slidebar 1 which projects slightly from the upper end of the guide-rail. The fact that guidance is provided to within close proximity of the end of the angular slidebar effectively prevents the angular slidebar 1 from being elastically deflected sideways by the lateral pressure exerted upon part of it by the impact of the tens-transmission finger 3. The walls of the recesses 9 are arranged, as Fig. 2 shows, parallel to the axle 2' coordinated to them of the numeral wheel 2, so that the tens-transmission finger 3 is aligned parallel to the lengthwise edge of the upper end face of the angular slidebar 1 and therefore impacts said angular slidebar with its entire surface.

The tens-transmission device can be mounted with the utmost facility, as the main components can be inserted from the side. This applies also to the numeral wheels 2, which are slipped from the side, together with the transfer wheels 20 integral with same, on to the freely projecting radial axles 2' of the body 15 of the counter mechanism. In addition, the transmission and driving members for the tens-carrying arrangement, i. e. the tens-transmission drum 16 and the stepped cylinder 17 are of special design enabling these components to be manufactured under conditions of extreme economy.

Figure 15:
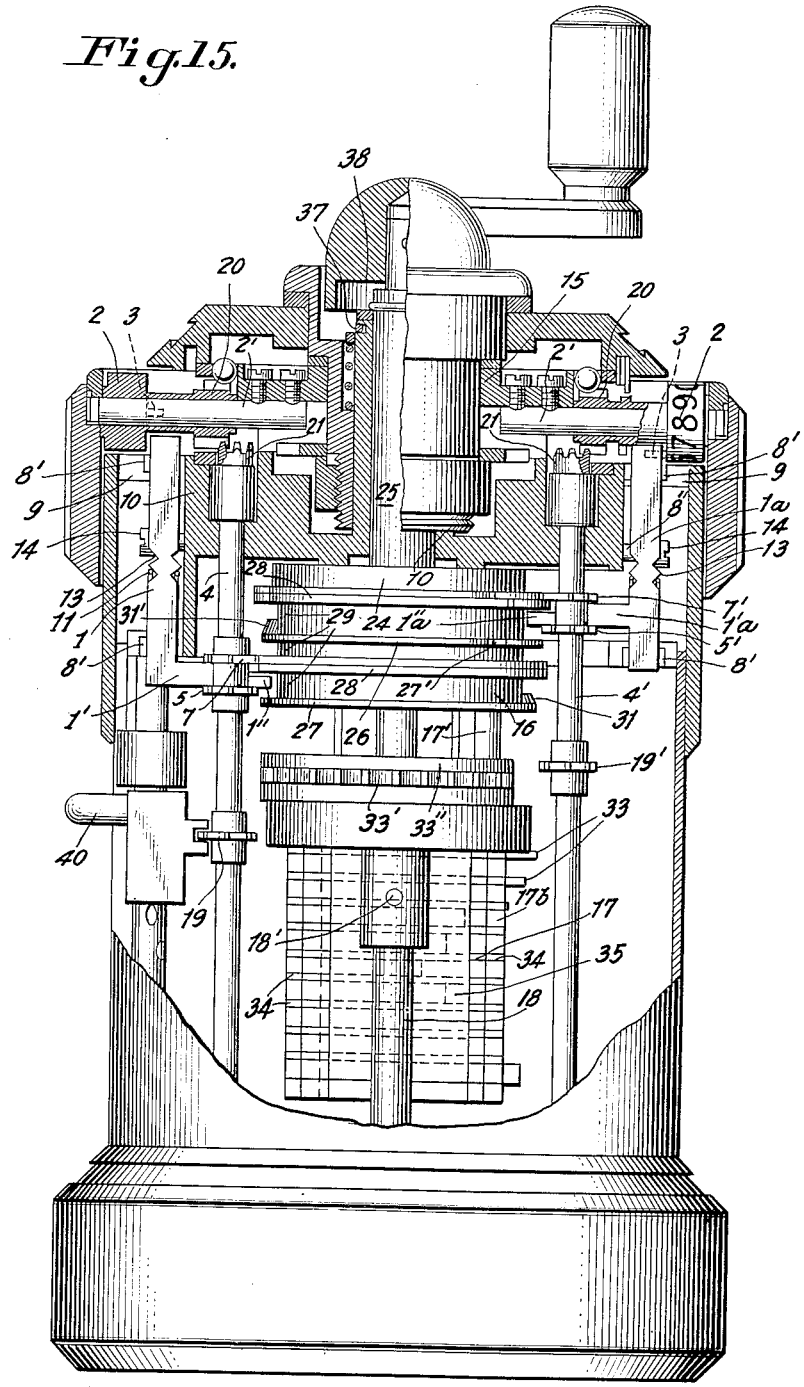
Fig. 15 is a side elevation view of a complete calculating machine of the invention with a portion of the exterior casing shown broken away to disclose the interior parts.

As shown in Figure 6 the tens-transmission drum 16 is so mounted as to be freely rotatable on the centrally-arranged driving shaft 18. The drum 16 is secured against axial displacement by a central bush-shaped extension 10' of the machine body 10 on the one side and by spring ring 37 on the other side. The ring 37 is arranged in an annular groove 38 of the long hub 25 of the drum 16 and it rests partly against the machine body. The drum 16 is coupled for rotation, by means of an entraining pin 17', with the stepped cylinder 17 rigidly mounted on the shaft 18 by a pin 17'. The pin 18' enters a semi-circular groove 32' and a slot 32" (Fig. 7) of the drum 16. The transmission and counter mechanism members are mounted in a circle round the stepped cylinder. The numerals 19 and 19' respectively designate the setting wheels, which are so mounted on the shafts 4 and 4' respectively as to be axially slidable and are manually set in the usual manner by means of setting handles 40 (Fig. 15). All the setting wheels 19, 19' transmit via crown wheels 21 to the transfer wheels 20 the movement imparted to them by the stepped cylinder 17. The tens-transmission drum 16 according to Fig. 4 consists of a hollow cylindrical body the external face of which carries a tens-carrying tooth 22 for the product counter and another one for the revolution counter, and also the locking discs 23 and 23' respectively for the ratchet or lock wheels 7 and 7' respectively, which latter are of Maltese-cross shape, and for the return-motion devices 6 and 6' respectively, consisting of oblique surfaces, for the tens-transmission slidebars 1 (1a) and the tens-transmission wheels 5, 5' coupled to the latter. If the tens-transmission drum 16 is manufactured as a diecasting, the tens-transmission teeth 22, 22' and the oblique return-motion surfaces 6, 6' are expediently cast in as independent components. The locking disc 23' for the ratchet wheels 7' and the tens-transmission tooth 22' and the return-motion surface 6' for the revolution counter are arranged on the drum 16 above the corresponding components for the product counter. The joint arrangement on the tens-transmission drum 16 of the transmission, locking and return-motion members appurtenant to the tens-transmission members of both counters simplifies the calculating mechanism. The construction of the element 16 as a drum is furthermore space-saving, since a relatively long spring retaining the stepped cylinder 17 in the position for addition and subtraction can be accommodated in the cavity of the tens-transmission drum.

Fig. 5 shows the position of the ratchet wheels 7 relatively to the locking disc 23 and of the teeth of the stepped cylinder for the product counter relatively to the setting wheels 19 and the tens-transmission wheels 5, which latter cover the wheels 19, in the normal position of the calculating machine. The position of the return-motion surface 6 for the slidebar 1, the tens-transmission wheels 5 and the ratchet wheels 7 is also apparent from Figure 5.

Of particular advantage, especially in regard to simplicity in manufacture, is the modification of the tens-transmission drum 16 and of the stepped cylinder 17 illustrated in Figs. 6 to 11. In this embodiment the tens-transmission drum and the stepped cylinder each consist of a core-piece 16' and 17b respectively. The cylindrical core 16' of the tens-transmission drum carries at its top a flange 24 which is integral with a long hub 25. Six rings are stacked against the lower portion of the core 16'. Of these rings, the rings 26, 26' are provided with the tens-transmission tooth 27, 27', and oblique return-motion surfaces 31, 31' for the tens-transmission slidebar 1, 1a of the product counter and revolution counter. The ring 28 and the flange 24 of the core-piece 16 are formed into the known types of locking or arresting components (Fig. 10) for the Maltese-cross wheels 7, 7', which are connected to the tens-transmission wheels 5, 5' (Figs. 1, 6). The rings 29 serve as spacer rings. To eliminate the possibility of the functional rings 26, 26' and 28 rotating on the drum 16 they are each provided with an inward projection 30 each fitting snugly in a slot 32 of the drum 16. The return-motion surfaces 31, 31' of the tens-transmission rings 26, 26' consist of a ridge formed by upward bending to which ridge the tens-transmission slidebars 1, 1a reach with their extension 1'', 1a'' (Figs. 1, 2, 6), said slidebars being moved back in an upward direction from their operating position to their normal position when the tens-transmission has been effected.

The stepped cylinder is designed similarly as the tens-transmission drum. The core piece 17b consists of a disc shaped part ending at its lower end in a hub provided with two ring segments of which the upper one is shorter in axial direction than the lower one. The toothed segments 33 (Fig. 6) of the product counter are pushed on the longer ring segment 35 whereas the three toothed segments 33', 33'' for the revolution counter are arranged on the upper segment 35'. The toothed segments 33'' are provided with one tooth only and they count the number of revolutions whereas the segment 33' having nine teeth is acting in the subtractive sense when the machine has been set for subtraction.

The segments of the stepped cylinder are provided with hook-like projections 34 (Fig. 7) and are secured by means of the latter on the ring-segments 35 and 35' respectively of the core-piece 17'. The rings and segments are prevented from falling off by flanging the lower edge 36 of the cores 16', 17b or by some other method and in the upward direction by the flange 24 or the disc-shaped part of the stepped cylinder.

A substantial reduction in the weight of the calculating machine is achieved by producing the core of the tens-transmission drum and of the stepped cylinder, as well as the spacer rings, of a material of low specific weight, while the functional rings are made of steel to ensure that their teeth are as resistant as possible and of long life.

The manner of operation of the tens-transmission device is that usual in known calculating machines. If, before the tens-transmission takes place, the tens-transmission finger 3 of the appurtenant numeral wheel 2 comes within the range of the angular slidebar 1 coordinated with it, said slidebar 1 is brought, with the tens-transmission wheel 5, into the operative range of the tens-transmission tooth 22. The ratchet wheel 7 is thereby displaced into the plane of the extension 23b of the recess 23a of the locking ring 23. This extension is above the tens-transmission tooth 22 (Fig. 4) with the result, that the ratchet wheel 7 is still free when the tooth enters into action. At the end of the rotation of the stepped cylinder the tens-transmission tooth moves the tens-transmission wheel by one tooth and via the counter members 21, 20 this movement is transmitted to the numeral wheel 2 of the next higher digit-position, this wheel 2 being thereby turned forward by one figure. Immediately upon this transmission the corresponding wheel 5 is locked because the locking component 23 of the tens-transmission drum 16 engages, owing to its greater radius, the ratchet wheel 7. At the commencement of a further rotation of the stepped cylinder, the tens-transmission wheels 5 which are in the transmission position are, before the stepped cylinder 17 can act upon the setting wheels 19, returned to the normal position by the oblique surfaces 6 and 31 respectively, which act on the angular slidebars.

The same action occurs when a tens-transmission is taking place in the revolution counter. The tens-transmission assemblies of the revolution counter are arranged at a different height from the tens-transmission assemblies of the product counter (see Fig. 6) to ensure that the two tens-transmission devices can operate independently of each other. The tens-transmission device can of course also be used in connection with straight-line construction, but in this case one stepped cylinder is necessary for each digit.

Figure 13:
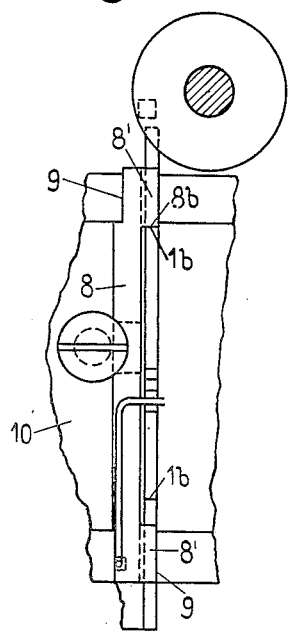
Figure 14:
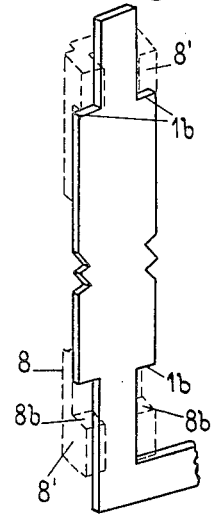

In the tens-transmission device to Fig. 1 the stroke of the angular slidebar 1 is essentially limited by the action of the spring 11. As, however, the springs 11, in spite of having the same shape and thickness, are, for known reasons, not always alike in their action, it may happen that among the several slidebars 1, small differences in the strokes occur which differences may detract from the absolute reliability in operation of the tens-transmission device. In order to achieve a reliably accurate stroke of the angular slidebars 1 without complicating the calculating machine by additional components, the embodiment modification of the tens-transmission device illustrated in Figs. 12 to 14 may be employed. The angular slidebars 41 of both counter mechanisms are widened in their middle section so as to provide shoulders 1b at top and bottom. Furthermore, the ends 8', of U-shaped cross-section, of the guide-rails 8 in which the angular slide-bars 41 are guided are lengthened so that the opposing inner end surfaces 8b project inwards a little from the recesses 9 in the machine body 10. In the normal position of the tens-transmission device the lower shoulder 1b is located at a distance from the end surface 8b of the guide-rail 8 exactly corresponding to the operating stroke of the angular slidebar. When a tens-carrying operation is performed the angular slidebar moves until the surface 1b strikes the surface 8b. The stroke of the angular slidebar is precisely determined by these stroke-limiting surfaces 1b and 8b. When the angular slidebar is returned by the return-motion surfaces 6 of the tens-transmission dome 16, the travel of said slidebar is limited by the top stroke-limiting surfaces 1b and 8b. The purpose of the springs 11 in this last described modification is to retain the angular slidebars in the two normal positions.

I claim:

1. In a pocket-size calculating machine, a machine body, a central driving member rotatably mounted in said body and having fixedly attached thereto a stepped cylinder, a plurality of counter mechanism and transmission members arranged in a circle around the axis of rotation of said driving members, said counter mechanisms including each a numeral wheel rotatable about an axis arranged radially with respect to the axis of said driving member, each numeral wheel being provided with a tens-transmission finger, a tens-transmission member having the form of a flat angular slidebar for each numeral wheel, a guide bar for each angular slidebar fixedly secured in an axial groove in the outer mantle surface of said body for slidably supporting said angular slidebar in a direction parallel to the axis of rotation of said driving member, said axial grooves being open toward the circumference of said body to permit radial insertion and removal of said guide bar and its respective slidebar into said body, said angular slidebar being actuated, on the free end of its leg which is positioned parallel to the axis of rotation of said driving member, by the tens-transmission finger on the respective numeral wheel to rotate the numeral wheel of the next higher digit position a distance of one number.

2. In a pocket-size calculating machine, a machine body, a central driving member rotatably mounted in said body and having fixedly attached thereto a stepped cylinder, a plurality of counter mechanism and transmission members arranged in a circle around the axis of rotation of said driving members, said counter mechanisms including each a numeral wheel rotatable about an axis arranged radially with respect to the axis of said driving member, each numeral wheel being provided with a tens-transmission finger, a tens-transmission member having the form of a flat angular slidebar for each numeral wheel, a guide bar for each angular slidebar fixedly secured in an axial groove in the outer mantle surface of said body for slidably supporting said angular slidebar in a direction parallel to the axis of rotation of said driving member, said axial grooves being open toward the circumference of said body to permit radial insertion and removal of said guide bar and its respective slidebar into said body, said angular slidebar being actuated, on the free end of its leg which is positioned parallel to the axis of rotation of said driving member, by the tens-transmission finger on the respective numeral wheel to rotate the numeral wheel of the next higher digit position a distance of one number, the other leg of said slidebar extending toward the center of said body, and a return motion member for said slidebar mounted on said body and adapted to actuate the inner end of said last-mentioned other leg of said slidebar.

3. In a pocket-size calculating machine, a machine body, a central driving member rotatably mounted in said body and having fixedly attached thereto a stepped cylinder, a plurality of counter mechanism and transmission members arranged in a circle around the axis of rotation of said driving member, said countermechanisms including in each digit position a numeral wheel rotatable about an axis arranged radially with respect to the axis of said driving member, each numeral wheel being provided with a tens-transmission finger, a tens-transmission member having the form of a flat angular slidebar for each numeral wheel, a guide bar for each angular slidebar fixedly secured in an axial groove in the outer mantle surface of said body for slidably supporting said angular slidebar in a direction parallel to the axis of rotation of said driving member, said axial grooves being open toward the circumference of said body to permit radial insertion and removal of said guide bar and its respective slidebar into said body, said angular slidebar being actuated, on the free end of its leg which is positioned parallel to the axis of rotation of said driving member, by the tens-transmission finger on the respective numeral wheel to rotate the numeral wheel of the next higher digit position a distance of one number, the other leg of said slidebar extending toward the center of said body, and a return motion member for said slidebar mounted on said body and adapted to actuate the inner end of said last-mentioned other leg of said slidebar, a rotatable adjustment shaft for each countermechanism arranged parallel to the axis of rotation of said driving member and operatively coupled with one of its ends with the number wheel of its respective countermechanism, a small tens-transmission wheel axially slidably mounted on said adjustment shaft and coupled with said last-named leg of the angular slidebar to bring said small tens-transmission wheel in operative connection with a numeral body which is rotatably coupled with said stepped cylinder.

CURT HERZSTARK.

REFERENCES CITED

The following references are of record in the file of this patent:

UNITED STATES PATENTS

| Number | Name | Date |
|---|---|---|
| 703,785 | Hamann | July 1, 1902 |
| 773,158 | Pfaff | Oct. 25, 1904 |
| 832,666 | Hamann | Oct. 9, 1906 |
| 972,360 | Graber | Oct. 11, 1910 |

FOREIGN PATENTS

| Number | Country | Date |
|---|---|---|
| 478,595 | Germany | July 4, 1929 |
| 569,761 | Germany | Feb. 8, 1933 |